United States Patent [19]

Rosdorff

[11] 3,845,279

[45] Oct. 29, 1974

[54] NOTATION SYSTEM

[76] Inventor: Leopold Willem Rosdorff, Androsdreef 84, Utrecht, Netherlands

[22] Filed: Feb. 28, 1973

[21] Appl. No.: 336,801

[30] Foreign Application Priority Data

Mar. 1, 1972 Netherlands .......... 7202713

[52] U.S. Cl. .......... 235/61.12 N

[51] Int. Cl. .......... G06k 19/06

[58] Field of Search .......... 235/61.12 N, 61.11 E; 340/146.32; 283/47; 84/461; 197/19, 20

[56] References Cited

UNITED STATES PATENTS

| | | | |
|---|---|---|---|
| 104,393 | 6/1870 | Wright | 283/47 |
| 3,600,593 | 8/1971 | Berler | 235/61.11 E |
| 3,676,644 | 7/1972 | Vaccaro et al. | 340/146.32 |
| 3,699,518 | 10/1972 | Greenough et al. | 340/146.32 |

*Primary Examiner*—Daryl W. Cook

*Attorney, Agent, or Firm*—Cushman, Darby & Cushman

[57] ABSTRACT

Data are recorded on an information carrier having at least one system of parallel lines thereon, subdivided into three groups, preferably constituting two outer groups of two lines and an inner group of five lines. The spacing between adjacent groups of lines is different from the spacing between adjacent lines in one group. Dots and dashes are applied at a constant angle to, and in progression along the length of, the lines, and have a pre-arranged information content by being placed at selected transverse positions.

1 Claim, 7 Drawing Figures

NOTATION SYSTEM

This invention relates to improvements in or relating to a method of recording data using an information carrier having a system of lines arranged thereon in parallel, and also to information carriers which are destined to be used with such methods, and further to processing apparatus for the recording, reading and sensing of data on such information carriers.

At the present time, data is often notated by using the usual alphabet, figures and a number of generally known symbols, or by a system in which the data is presented in the form of special symbols. An example of the last quoted system is the punched tape in which the symbols are combinations of perforations. Such a tape is employed to provide input data to calculators or data processing equipmemt, and also, for example, for the operation of electric typewriters.

Normal script of letters and figures is directly readable by those who have been taught to read, but is difficult to notate at a fast rate. To improve the rate of notation the stenographic system has been brought into use, which may be used in a shortened version or not. However, such a system is readable, in general, only by those that have taken down the stenographically converted information. The symbols of such a system are certainly not suitable to be read through the medium of a machine of similarly employed apparatus therefor.

One object of the present invention is to provide a method which is an inprovement on those foregoingly described herein and in which data can be notated in a simple and rapid manner such that, after a short period of training, one can easily read such data.

It is a further object of this invention to provide a data recording system in which data recorded can easily be read by apparatus therefor.

According to the present invention, there is provided:

An information carrier having at least one system of lines arranged in parallel relationship thereon, said at least one system of lines being formed by three associated groups of lines, the perpendicular distance between adjacent ones of said three groups of lines being different from the perpendicular distance between adjacent ones of the lines within each of said groups of lines.

The use of three groups of lines, in which the spacing between the groups differs from that between the individual lines of each group results in an easily surveyable system of notation which with a little training permits easy reading thereof. Also, the use of three groups of lines makes for so many possibilities of variation that the majority of the alpha-numerical or other often recurring symbols can be denoted simply by a dash and/or a dot. Furthermore, there is provided a possibility of concentrating certain of the notation marks within a limited portion of associated groups of lines, such that, in addition, a simple combination of notation marks for often recurring letter combinations is possible.

It has been found that extremely good results are obtained when the two outer groups of lines are formed each by two lines whilst the group of lines therebetween is formed by five lines. Thus, preferentially, the distance between adjacent ones of the three groups of lines is twice the mutual distance between the individual lines of each of the groups. Although normally, for the notation of marks for a letter, figure or a combination of two or more thereof, the appropriate dashes and/or dots will be placed at right angles to the system of lines, the system of lines in the groups can be provided with guide lines arranged at a substantially constant angle thereto for adaptation to the frequently sloping characters of manuscript, this last-mentioned facility having the object of determining the sections along the carrier where notation marks for certain data can be appended.

The invention will be better understood from the following description of an embodiment thereof, read with reference to the accompanying drawings, in which.

Figure 1:
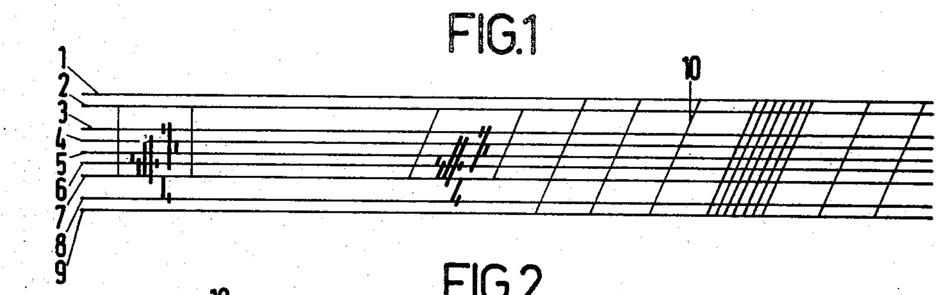
FIG. 1 shows a system of lines as may be preprinted on paper.

Referring in the first instance to FIG. 1, the system of lines, which can be pre-printed on paper, comprises nine lines designated by the reference numerals 1 to 9 from the top one to the bottom one respectively, and which lines are arranged in parallel ralationship one to another. The distance between lines 1 and 2, 3 and 4, 4 and 5, 5 and 6, 6 and 7, and between lines 8 and 9 is 2 millimeters; while the distance between lines 2 and 3, and between lines 7 and 8 is 4 millimeters. On the right-hand side of FIG. 1, a number of guide-lines 10 are shown, which guide-lines render the system of lines suitable for the notation of marks in sloping prolongation one under the other.

Figure 2:
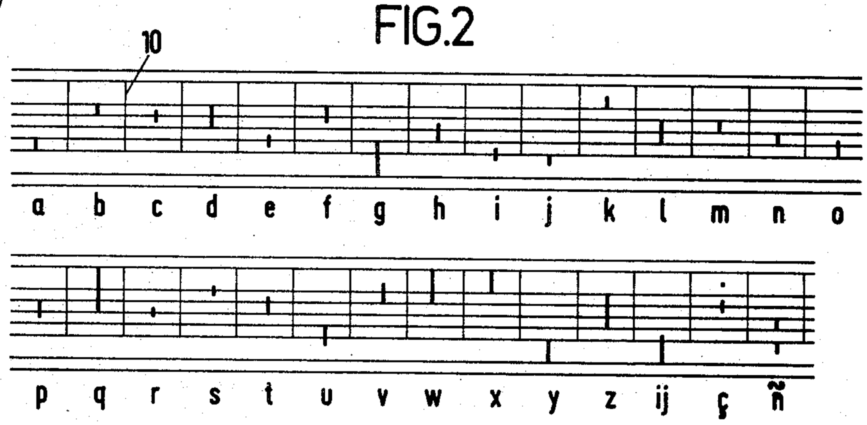
FIG. 2 shows notation marks for the letters of the alphabet appended to a system of lines as shown in FIG. 1.

Referring now to FIG. 2, the notation marks for the letters of the alphabet are shown appended to the system of lines shown in FIG. 1, and in which, under the marks for a particular letter, the letter itself is indicated. In this example no distinction is made between capital and small letters.

Figure 3:
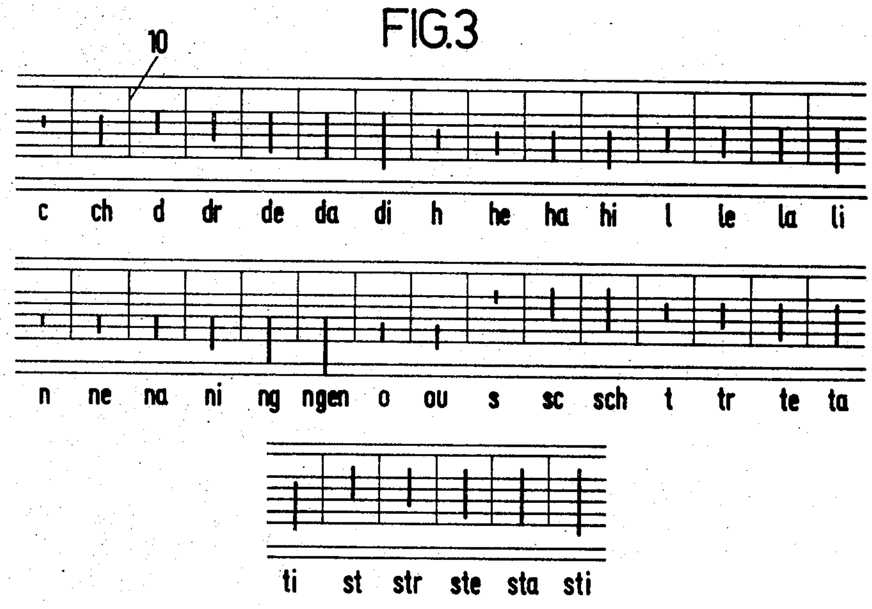
FIG. 3 shows notation marks for a large number of often recurring letter combinations, on the basis of the notation according to FIG. 1.

FIG. 3 shows notation marks for a considerable number of recurring letter combinations, on the basis of the corresponding notations thereof in FIG. 2. As shown in FIG. 2, the vowels are all concentrated within the bottom part of the middle group of lines, so that letter combinations can be formed in an easy manner. In letter combinations having vowels therein, the latter will, in general, be found to follow consonants, so that through the combination of the notation for the vowel and the consonant one above the other, the script remains easily readable from above downwardly and from left to right. In FIG. 2 and 3, a series of vertical guide-lines 10 are shown. Between these guide-lines the marks for one letter or letter combination are appended.

Successive marks for letter of letter combinations in a word are, as far as possible, appended under each other in prolongation on imaginary image lines at a right angle or sloping with respect the system of lines and in succession from left to right. (See FIG. 1).

Pre-printed guide-lines can, when closely spaced to one another, define the frames of successive notation spaces. Guide-lines can also be used as word separating lines; and in that case it is not necessary to have such lines in a pre-printed form on the carrier. Guide-lines are not strictly necessary, this is really dependent on the accuracy with which the marks are notated.

Figure 4:
FIG. 4 shows a number of possible notation marks for denoting accents and punctuation marks, and also two-letter combinations and capitals.

In FIG. 4, there are shown some possible notation marks for punctuation, accentuation and common signs, and also for two successively occurring letters and capitals. To mark the end of a sentence, or to distinguish between each associated data group, a full stop is appended on the line 5 in FIG. 4, at 11.

Figure 5:
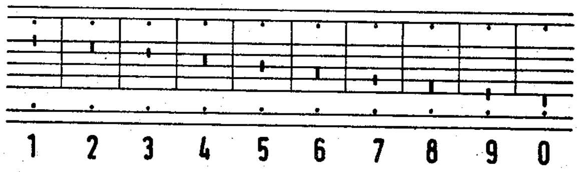
FIG. 5 shows notation marks for figures.

FIG. 5 illustrates notation marks for figures, and in which the dash in the middle one of the groups of lines is indicative of the value of the number, whilst the dot below line 2 and above line 8 is indicative that the data therebetween relates to figures as opposed to letters. When a series of figures are to be notated in succession, it is only necessary, if so desired, to mark the beginning and end of the series with the general mark for figures i.e. the dashes in the positions shown. The figures of the series then only need to be indicated by a dash for each in the appropriate place therefor between or on any one of the lines of the middle group of the system.

Figure 6:
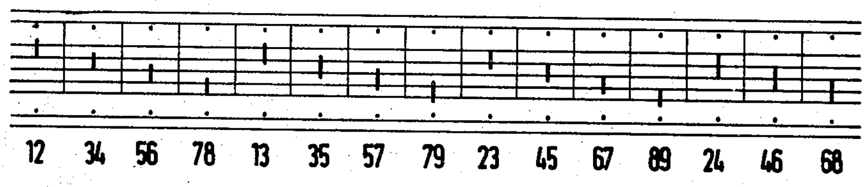
FIG. 6 shows marks symbolising a number of figure combinations.
Figure 7:
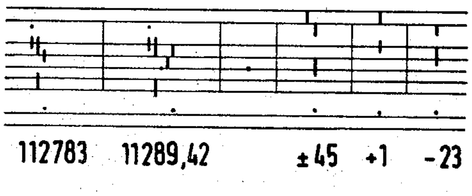
FIG. 7 shows examples of marks symbolising totals and various signs.

This is further illustrated in FIG. 6 and 7, by way of example, for a succession of digits.

It will readily be understood from the foregoingly described and illustrated examples of the use of notation marks of such a simple form, that they may be read at a very fast rate by appropriate reading apparatus, whilst still being readable by those having had a modicum of training in the process, and they are such that no excessive demands are placed on those that are required to notate data in the form of marks by hand. Manually notated information can therefore be processed by appropriate apparatus therefor with very little complication.

It will also be recognised that the system as described and illustrated is suitable for abreviated or unabreviated stenographic script in which data can be recorded at a faster rate than is possible by a typewriter. Furthermore stenographic versions of the proposed system, notated by hand, are quickly readable and recognisable by mechanical means, even better so than is the presently used standard script, either handwritten, in machine script or print. Also, such a stenographic system is universally readable for those that master it. Irrespective of whether the system is used in stenographic form or not, an important advantage is that the number of movements of the hand, per letter or figure symbol, are extremely limited, as a consequence of which fast writing speeds with qualitively good readability are obtained without fatique.

With the proposed method it is possible to feed data manually recorded on pre-printed paper directly into appropriate apparatus for further processing without the necessity of employing an intermediary such as, for example, a punched card, punched tape, magnetic tape or a magnetic disc. In comparison with the traditional hand-written script, the readability, reproduceability as well as the notation rate are considerably improved. Furthermore, in comparison with other symbolic scripts in which, for example, particular data is to be recorded in pre-printed sections in a linear form, the direct readability is considerably enhanced and the possibility of recording large quantities of information is not limited by the division of the pre-printed information is not limited by the division of the pre-printed information carrier such as the case is with known systems of linearly recorded information.

It will be seen in the accompanying drawings that the majority of the letters, and in certain cases the figures, are represented only by a single mark, whilst a single but longer mark is representative of a combination of letters or figures. The system lends itself to handwritten script, machine appended script as well as printed script, in which the same symbols are utilised all cases.

Due to the use of simple symbols and a suitable choice of positions for the different marks in the groups of lines, a particularly fluently readable content is obtained.

It is noteworthy that, both for appending the marks and for the reading thereof, in a simple manner, use can be made of a slotted template in which the boundaries of the slots coincide with the imaginary image lines along which the dashes and dots are to be distributed. The distance between the lines can be chosen according to requirements dependent on the clarity of readability required or the method of notation to be employed. The use of a template is particularly useful when the recorded script is, for example, destined for direct input to a computer.

In the process of pre-printing the paper of the information carrier with the system of lines in groups, a single line such as that designated 9 in FIG. 1, can be combined with a line, such as is designated by the reference numeral 1, but belonging to the next following group of lines thereunder. A line common to two successive groups is preferably printed as a line which is thicker than the lines therebetween, thus a more easily distinguishable line of demarcation between groups of lines is obtained. Indeed it is not necessary to actually represent the lines as shown, but use can be made of coloured bars instead, so that the outlines of the bars form a lineation. When notated data is destined for further processing with appropriate apparatus therefor, the groups of lines can be applied to spool-wound ribbons or tapes, in which case the nine lines of the associated groups of lines extend the whole length of the ribbon or tape.

FIG. 3 illustrates a number of frequently recurring letter combinations such as those which are present in English, French, German, Dutch, Spanish, Italian, the Scandinavian languages, and in Greek and Latin. It is possible, without further ado, to use a somewhat modified system of notation for other languages in which other letter combinations occur.

Furthermore, the most recurring letters such as the *e*, the *r* and the h are denoted by a mark applied in a position as central as possible with respect to the groups of lines; on the other hand, the letter *k*, for example, which appears infrequently in many languages, is applied in a position which is somewhat offset from the centre.

Symbols for uneven numbers are denoted by a dash which each cross the third, fourth, fifth, sixth and seventh lines, whilst symbols for even numbers are denoted by dashes which extend between two adjacent lines. It is only for the figure O that the symbol therefor is appended below the seventh one of the lines.

The system of notation described and illustrated herein is especially suitable for the presentation of marks symbolising different formal-logical relationships such as, for example, conjunction, disjunction, superimplication, subimplication, equivalency, subject implication, subject equivalency and negation.

The following examples of aids in the use of the system of notation described and illustrated herein come forward for consideration: sensing apparatus, identifying units, slotted stencils and backgrounds for the display of information, spools for information carriers in band or tape form, paper and other materials that are suitable for use as information carriers of standard format whether or not they are in tape form printed with guide lines, adapted notation apparatus, typewriters, text books and audio-visual aids for the dissemination of knowledge concerning the system of notation.

I claim:

1. A method of recording data using an information carrier having at least one system of lines arranged in parallel relationship thereon, said at least one system of lines being formed by three associated groups of lines, the perpendicular distance between adjacent ones of said three groups of lines being different from the perpendicular distance between adjacent ones of the lines within each said group, comprising the step of manually recording symbols progressively longitudinally of said lines, each symbol being made up of at least one notation mark selected from the group consisting of a set comprising combinations of dots and dashes, and a set comprising dashes, at least some of which intersect at least two of said lines, and being applied within the confines of the system of lines to extend in a direction making a substantially constant angle with said lines.

* * * * *